Oct. 25, 1938.   H. G. THUNDER   2,134,422
AUTOMOBILE BUMPER
Filed March 27, 1935
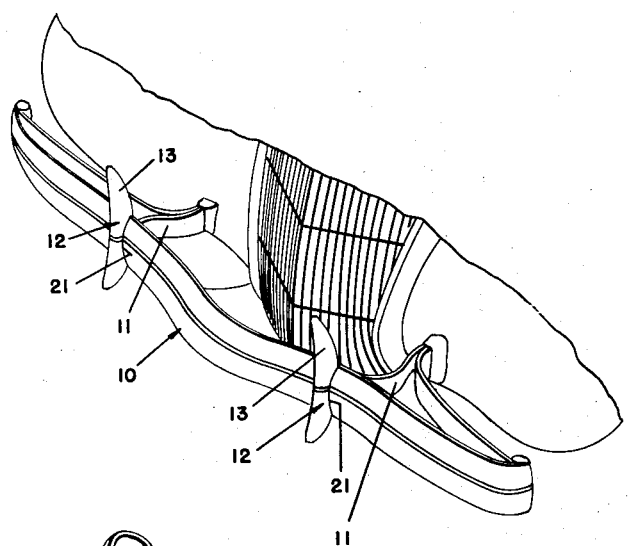
FIG.1.
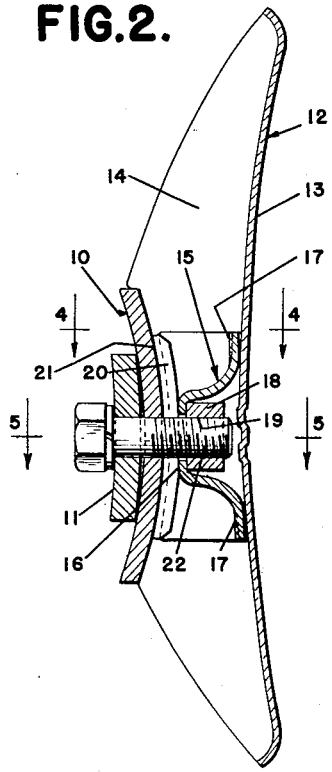
FIG.2.
FIG.3.
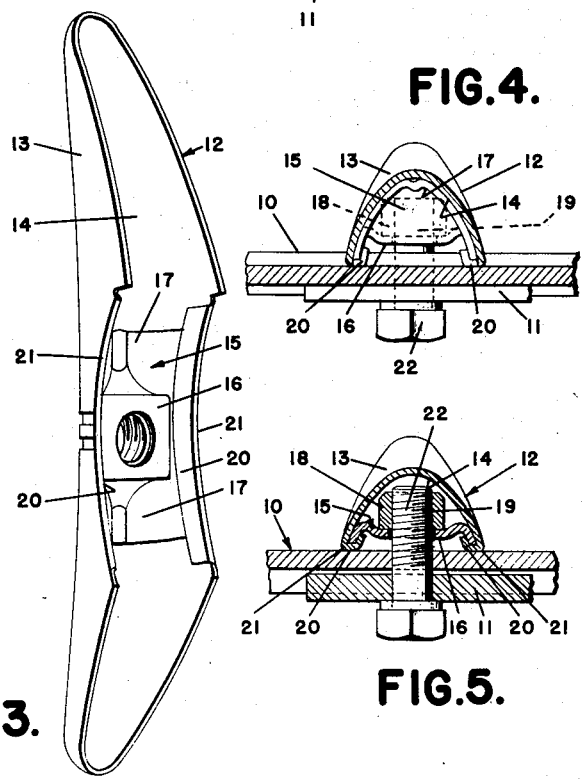
FIG.4.
FIG.5.
INVENTOR
HAROLD G. THUNDER
BY Whittemore Hulbert
Whittemore & Belknap
ATTORNEYS Patented Oct. 25, 1938

2,134,422

UNITED STATES PATENT OFFICE 2,134,422

AUTOMOBILE BUMPER

Harold G. Thunder, Detroit, Mich., assignor to Motor Products Corporation, Detroit, Mich., a corporation of New York Application March 27, 1935, Serial No. 13,334

4 Claims. (Cl. 293—55)

This invention relates to automobile bumpers and more especially to a bumper guard for automobile bumpers.

The invention has as one of its important objects to provide a bumper guard or device of this character, the construction of which permits the same to be stamped from sheet metal and assembled without the aid of welding.

The above and other objects of the invention as well as the novel details of construction of one form thereof will be made more apparent as this description proceeds, especially when considered in connection with the accompanying drawing, wherein Figure 1 is a perspective view of an automobile bumper provided with my improved bumper guard;

Figure 2 is an enlarged vertical sectional view through the guard and bumper;

Figure 3 is an inside perspective view of the guard removed from the bumper;

Figure 4 is a section on line 4—4 of Figure 2, and

Figure 5 is a section on line 5—5 of Figure 2.

As seen from Figure 1, there is illustrated a bumper 10 secured by supports or brackets 11 to the motor vehicle. The reference character 12 indicates the bumper guard forming the particular subject matter of this invention.

The body 13 of the bumper guard is preferably stamped from sheet metal and is shaped to provide any preferred or desired longitudinal contour or configuration as well as surface decoration. The body is substantially channel shape in cross section, as illustrated probably best at Figures 3, 4 and 5.

Located within the channel 14 of the body 13 and intermediate the ends thereof is a supporting member 15 in the form of a housing, also preferably stamped from sheet metal. This housing member 15 has a central portion 16 spaced from the bottom of the channel 14 and has its end portions 17 substantially channel shaped to fit snugly within the channel 14 of the body member 13. The central portion 16 is shaped to receive a bolt engaging member or nut 18 having a threaded bore 19. The nut 18 is located within the channel portion of the body member 13 and is held against relative movement therein by means of the supporting member 15.

The opposed longitudinal edges of the body 13 are provided with flanges or lips 20 which are bent into engagement with the opposed edges of the supporting member 15 and act to rigidly hold and secure this supporting member in place within the channel 14.

As illustrated, the opposed longitudinal edges of the body 13 may be shaped as at 21 for engagement with the impact face of the bumper 10, and the bumper guards 12 are secured in place by means of bolts 22 or the like which pass through the bumper and are threaded into the nut or bolt receiving member 18.

As will be apparent, the herein described construction may be quickly and economically manufactured and assembled because both the body 13 and the supporting member 15 may be stamped from sheet metal and assembled together with the nut 18 merely by crimping or bending over the lips 20.

While one embodiment of the invention has been described herein somewhat in detail, reservation is made to make such modifications of the structure as may come within the purview of the accompanying claims.

What I claim as my invention is:

1. A bumper guard for attachment to the bumper of a motor vehicle comprising a body member substantially channel-shaped in cross section and having portions projecting above and below the edges of the bumper a distance sufficient to prevent the parts of other vehicles from riding over or under the bumper, a nut supporting member correspondingly channel-shaped in cross section fitted within the channel of the body member and having a portion thereof offset in a direction away from the base of said body member to form a housing of sufficient dimension to receive and support a nut, said offset portion being apertured to receive a bolt for engagement with said nut, and flanges at the free edges of the leg portions of one of the channel members crimped over the adjacent leg portions of the other channel member to secure the same in assembled relationship and to provide bearing surfaces for engagement with the impact face of the bumper.

2. A bumper guard for attachment to the bumper of a motor vehicle comprising a body member substantially channel-shaped in cross section and having portions projecting above and below the edges of the bumper a distance sufficient to prevent the parts of other vehicles from riding over or under the bumper, a nut supporting member correspondingly channel-shaped in cross section fitted within the channel of the body member with the outer sides of the base and leg portions contacting with the inner sides of the corresponding portions of the body member, said nut supporting member having a portion of the base offset intermediate the ends thereof in a direction away from the base of the body member to cooperate with the latter to form a housing of sufficient dimension to receive a nut, said offset portion being apertured to receive a bolt for engagement with said nut, and flanges at the free edges of the leg portions of one of the channel members crimped over the adjacent leg portions of the other channel member to secure the same in assembled relationship, said crimped portion providing a bearing surface for engagement with the bumper.

3. A bumper guard for attachment to the bumper of a motor vehicle comprising a body member substantially channel-shaped in cross section and having portions projecting above and below the edges of the bumper a distance sufficient to prevent the parts of other vehicles from riding over or under the bumper, a nut supporting member correspondingly channel-shaped in cross section fitted within the channel of the body member and having a portion thereof offset in a direction away from the base of said body member to form a housing of sufficient dimension to receive and support a nut, said offset portion being spaced inwardly from a plane including the marginal edges of the legs of the channel-shaped body member and having an opening therethrough of a dimension to receive a bolt threaded for engagement with said nut, and flanges on the leg portions of one channel crimped over the flanges on the leg portions of the other channel to provide bearing surfaces for engagement with the impact face of the bumper.

4. A bumper guard for attachment to the bumper of a motor vehicle comprising an elongated stamping having portions projecting above and below the edges of the bumper a distance sufficient to prevent the parts of other vehicles from riding over or under the bumper, opposed longitudinal flanges on said stamping having the central portions thereof bent inwardly to provide bearing surfaces to receive the bumper, said inwardly bent portions being shaped complementary to the configuration of the impact face of the bumper for engagement therewith, a nut supporting member substantially channel-shaped in cross section fitted between the opposed longitudinal flanges of said stamping and held therein by engagement with the inwardly bent portions of said flanges, said nut supporting member having a portion thereof offset in a direction away from the base of said stamping to form a housing to receive and support a nut, said offset portion being apertured to receive a bolt for engagement with said nut.

HAROLD G. THUNDER.